United States Patent [19]

Payne

[11] Patent Number: 4,919,570

[45] Date of Patent: Apr. 24, 1990

[54] PORTABLE ON SITE SOIL TREATMENT SYSTEM

[75] Inventor: Frederick C. Payne, Charlotte, Mich.

[73] Assignee: Midwest Water Resource, Inc., Charlotte, Mich.

[21] Appl. No.: 276,650

[22] Filed: Nov. 28, 1988

[51] Int. Cl.$^5$ .............................................. B01D 13/00
[52] U.S. Cl. ................... 405/128; 134/22.12; 134/22.13; 134/22.14; 134/22.16; 134/61; 134/62; 134/120; 405/129
[58] Field of Search ............... 405/128, 129, 258, 263, 405/264, 265; 210/767, 772, 805, 807, 164, 167; 134/22.11, 22.12, 22.13, 22.14, 22.15, 22.16, 22.17, 22.18, 22.19, 61, 62, 104.3, 120, 134

[56] References Cited

U.S. PATENT DOCUMENTS

| | | | |
|---|---|---|---|
| 3,893,656 | 7/1975 | Opacic et al. | 405/128 X |
| 4,448,690 | 5/1984 | Maphis | 405/128 X |
| 4,533,475 | 8/1985 | Chiarito | 210/807 X |
| 4,575,391 | 3/1986 | DeBoodt | 405/264 X |
| 4,611,950 | 9/1986 | Russomano | 405/128 |
| 4,660,639 | 4/1987 | Visser et al. | 166/267 |
| 4,663,085 | 5/1987 | Enda et al. | 134/104.3 X |
| 4,730,672 | 3/1988 | Payne | 166/266 |
| 4,765,902 | 8/1988 | Ely et al. | 405/128 X |
| 4,774,002 | 9/1988 | Gutman et al. | 210/805 X |
| 4,774,007 | 9/1988 | Gordon | 210/805 X |
| 4,801,384 | 1/1989 | Steiner | 210/772 X |

*Primary Examiner*—Randolph A. Reese
*Assistant Examiner*—J. Russell McBee
*Attorney, Agent, or Firm*—Thomas J. Dodd

[57] ABSTRACT

Treatment apparatus for contaminated soils which includes a plurality of interconnected vessels which are cyclically connected to a pumping station and a treatment station. Contaminated soil is excavated and placed in the treatment vessels which are then sealed prior to activation of the pump, which may circulate a variety of compounds through the vessels depending upon the type of contaminants present in the soil.

9 Claims, 2 Drawing Sheets

PORTABLE ON SITE SOIL TREATMENT SYSTEM

FIELD OF THE INVENTION

This invention relates to treatment of contaminated earth and will have application to treating small quantities of excavated earth at the contamination site.

BACKGROUND OF THE INVENTION

In situ soil treatment systems have recently become popular alternatives to treating soils which have been contaminated by a wide variety of pollutants. These on site systems are vastly more efficient and economical than conventional excavation and hauling methods. Some of the more popular contaminant removal systems are shown in U.S. Pat. Nos. 4,593,760; 4,660,639; and 4,730,672. These methods involve either volatilization and/or vacuum withdrawal of the contaminants from within the soil, where the contaminants are either neutralized, destroyed, or discharged into the atmosphere.

Excavation and dumping remains a viable alternative in treating small quantities of contaminated soil. Typically, the contaminated soil is hauled off and dumped at a landfill or hazardous waste site depending on the type of contaminant present. Recently, tougher environmental laws have been passed, which will limit dumping of this sort, even in a hazardous or toxic waste dump. This is a disadvantage for small dumpers (up to about 100 cubic yards of contaminated soil) since the processes outlined above are not cost effective for small areas. A solution to treat the soil and replace it or to treat before dumping to meet regulations was needed.

SUMMARY OF THE INVENTION

The apparatus of this invention is designed to treat small amounts (normally up to 120 cubic yards at a time) of contaminated soils which have been excavated. The apparatus includes one or more soil treatment vessels cyclically connected to a pumping station and a treatment station.

Contaminated soil is deposited in the treatment vessels and the lids are sealed. Fluid is pumped through the pumping station to the vessels to remove the contaminants from the soil where they are treated at the treatment station. After decontamination of the soil, the soil is either dumped back at the excavation site or hauled away to a disposal area, such as a landfill.

Accordingly, it is an object of this invention to provide a method and apparatus for removing contaminants from excavated soils.

Another object of this invention is to provide for soil decontamination apparatus which is adaptable to recover several different varieties of contaminants.

Another object of this invention is to provide for soil decontamination apparatus which is portable, efficient and economical.

Other objects of this invention will become apparent upon a reading of the following description.

BRIEF DESCRIPTION OF THE DRAWINGS

A preferred embodiment of the apparatus has been depicted for illustrative purposes only wherein.

DESCRIPTION OF THE PREFERRED EMBODIMENT

Figure 1:
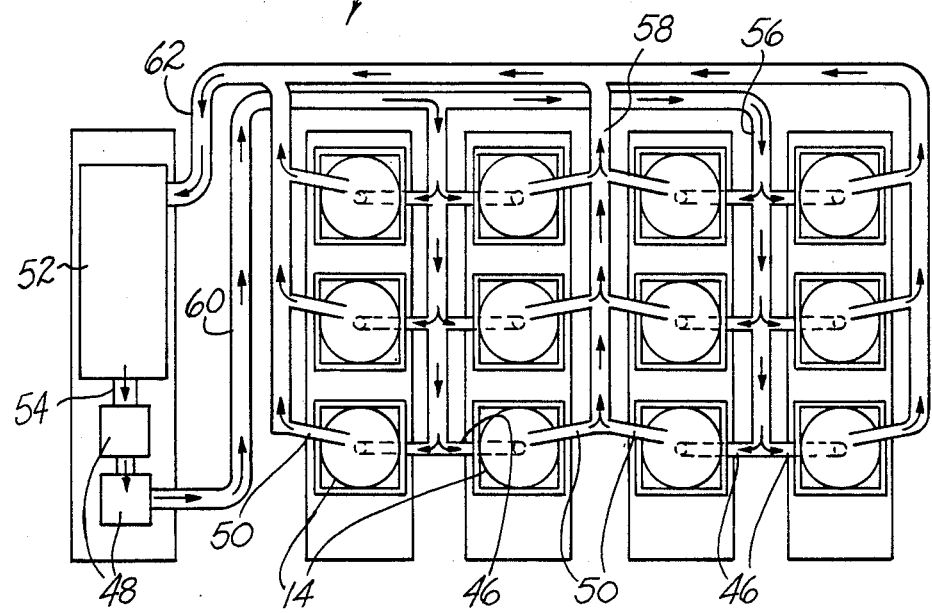
FIG. 1 is a schematical plan view of the apparatus.
Figure 2:
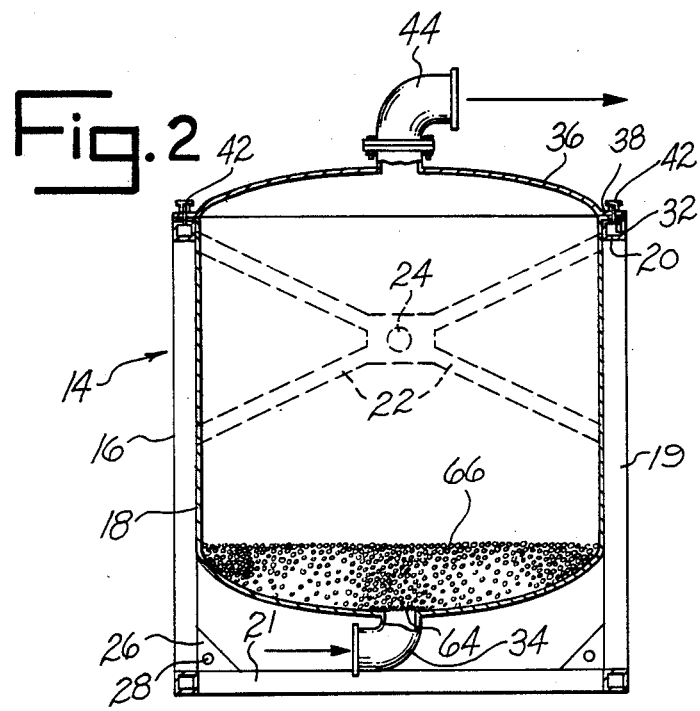
FIG. 2 is a sectional view of a treatment vessel prior to loading.
Figure 3:
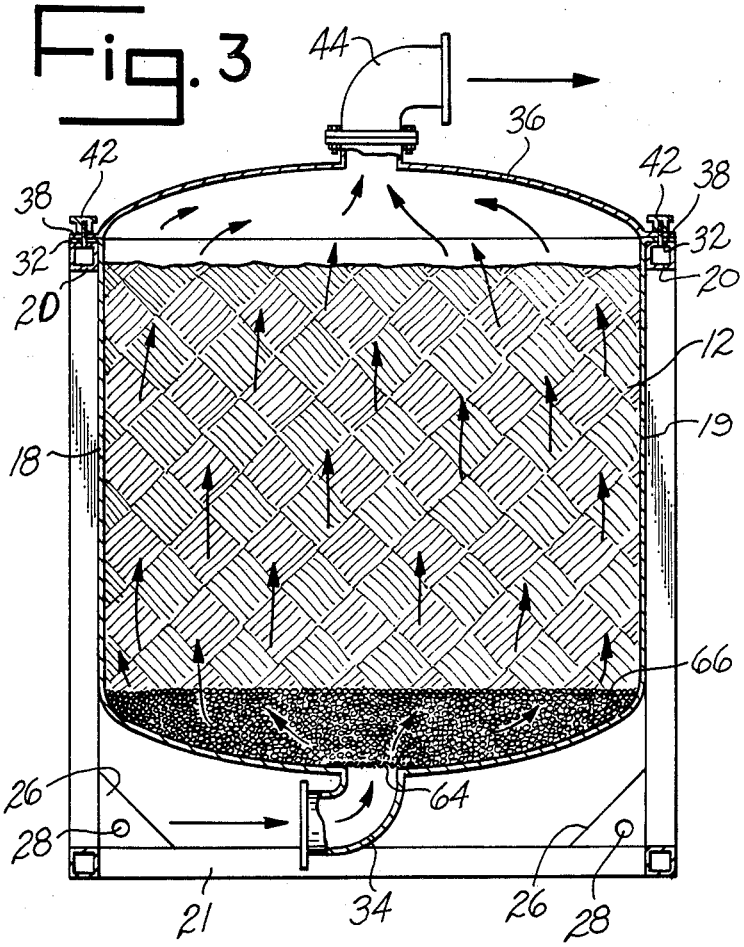
FIG. 3 is a sectional view of the treatment vessel loaded with contaminated soil with the apparatus in operation.

The preferred embodiment herein described is not intended to be exhaustive or to limit the invention to the precise form disclosed. It is chosen and described to explain the principles of the invention and its application and practical use to enable others skilled in the art to utilize the invention.

Referring now to the drawings, reference numeral 10 refers generally to a soil treatment apparatus which forms the subject matter of this invention. Apparatus 10 generally serves to remove contaminants from soil 12 which has been excavated from a contamination site and deposited in one or more treatment vessels 14.

Figure 4:
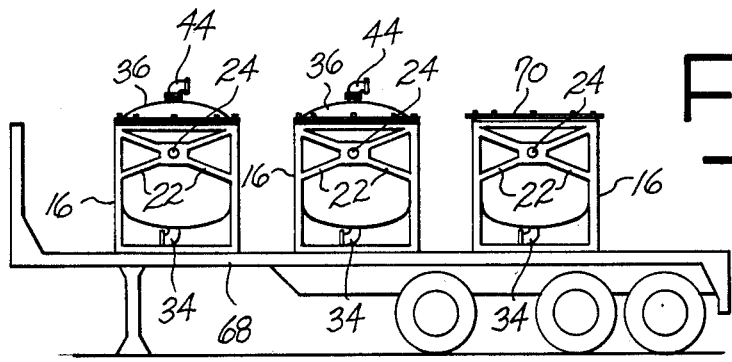
FIG. 4 is an elevation view of the apparatus.

Each treatment vessel 14 (twelve are shown, but the number will vary based upon the amount of soil to treat) includes an outer support frame 16 which has interconnected vertical frame members 18, 19 and horizontal frame members 20, 21, as shown. Frame 16 also includes cross members 22 (FIG. 4) which join at central boss 24 to define a handle through which vessel 14 may be lifted. Frame 16 may also include bottom corner located angles 26 which have bores 28 to allow vessel 14 to be tilted to dump soil as the vessel is lifted.

Vessel 14 also includes container 30 which is formed of durable metal and has a carrying capacity of about ten cubic yards. Container 30 has an upper lip 32 which overlies and is supported by upper horizontal frame member 20. Container 30 includes a lower fluid inlet port 34. Container 30 is covered by a lid 36 which has an outer flange 38 overlying lip 32 and secured in sealing engagement to frame member 20 by fasteners 42. Lid 36 is preferably convex-shaped and includes an outlet port 44. It should be understood that the inlet and outlet designations are for illustrative use only as the function of the two parts could be reversed during certain applications of the decontamination process.

Each vessel inlet port 34 is connected via a conduit 46 to a treatment station 48. Each vessel outlet port 44 is connected via conduit 50 to a fluid pumping station 52. Treatment station 48 is connected via a conduit 54 to pumping station 52 such that apparatus 10 functions cyclically. In the event of use of numerous vessels 14, conduits 46, 50 are connected with manifolds 56, 58, respectively, which flow into a main conduit 60, 62 connected in flow communication with stations 48, 52.

Apparatus 10 operates as follows. For purposes of illustration a process is described in which pumping station 52 includes a vacuum pump (not shown) which draws air from and pumps air into vessels 14 to volatilize volatile organic contaminants present in soil 12. It is understood that by circulating fluids such as low pH water or acids through vessels 14, metal contaminants would be drawn from soil 12 and delivered to a metal scrubbing bed, while circulating fluid materials which promote biological breakdown of non-volatile organic contaminants through the vessels would liberate non-volatile organic contaminants. Combinations of these treatments, and others could also be employed by the apparatus 10.

In the volatilization operation illustrated, each vessel 14 to be used is fitted with a screen 64 which covers inlet port 34 to prevent soil egress into conduit 46. A quantity of fluid porous material such as pea gravel 66 is poured into vessel 14 and covers screen 64. Soil 12 is then deposited into the vessel container 30. Fluid such as clean air is drawn from vessels 14 and circulated by vacuum pump (not shown) through conduit 54 to treatment station 48 which in this operation is preferably a bed of activated carbon or other similar contaminant neutralizing or capturing device (not shown). The air is delivered through conduit 46 to vessels 14 where the air enters container 30 and passes rapidly through soil 12 to volatilize contaminants entrapped in the soil. The volatilized contaminants exit the container 30 along with the air and are delivered through outlet port 44 to conduits 50, 54 and thence to carbon bed treatment station 48 where the contaminants are neutralized or otherwise treated.

The cyclical flow of fluid through apparatus 10 insures constant volatilization of entrapped contaminants and transport to treatment station 48. After chemical treatment or other testing of soil 12 to determine that the soil is contaminant free, or safe for dumping according to law, vessel 14 is lifted from its support structure, shown as flat bed trailer 68 by a crane (not shown) and the cleaned soil dumped from the vessel. The process may then be repeated on additional quantities of soil if necessary. After treatment of all the affected soil is completed, lids 36 are replaced by generally flat shipping lids 70 for transport to the next site.

It is understood that the above description does not limit the invention to the above-given details, but may be modified within the scope of the appended claims.

I claim:

1. Apparatus for treating contaminated earth, said apparatus comprising containment means for holding said contaminated earth during treatment, said containment means comprising one or more treatment vessels, each treatment vessel containing a quantity of contaminated fluid permeable earth and having an inlet port and an outlet port, means for sealing each treatment vessel against leakage of said earth, a first conduit connecting each treatment vessel inlet port in flow communication with a pumping station which pumps fluid through each treatment vessel, a second conduit connected in flow communication between each treatment vessel outlet port and a fluid treatment station, and a third conduit connecting said pumping station in flow communication with said fluid treatment station wherein said fluid is recirculated through said conduits and through said treatment vessels to provide for continuous treatment of said contaminated earth while in said treatment vessels.

2. Apparatus according to claim 1 wherein said contaminated earth contains volatile organic compounds, said fluid is air and said treatment station includes an activated carbon bed.

3. Apparatus according to claim 1 wherein said contaminated earth contains aqueous metals, said fluid is aqueous acid, and said treatment station includes an adsorbent metal scrubbing bed.

4. Apparatus according to claim 1 wherein said contaminated earth contains non-volatile organic compounds, and said fluid is a material suitable to promote biological breakdown of said non-volatile organic compounds.

5. Apparatus according to claim 1 wherein each treatment vessel includes a removable lid, handle means connected to the vessel to allow said vessel to be lifted from a supporting surface, each vessel further including pivot means to allow the vessel to be tipped when lifted whereby earth contained in the vessel is removed.

6. Apparatus of claim 1 wherein said inlet port is located at a bottom wall of each vessel, a screen covering said inlet port to prevent entry of said contaminated earth into said second conduit.

7. Apparatus of claim 6 and a quantity of fluid porous granular material overlying said screen in each treatment vessel, said granular material for further preventing entry of said contaminated earth into said second conduit.

8. Apparatus of claim 1 wherein said first and second conduits are connected in flow communication to first and second manifolds, each manifold including a plurality of conduits connected to the individual treatment vessels.

9. A method of treating contaminated earth comprising the steps of:
   (a) providing one or more treatment vessels each connected in flow communication between a pumping station and a treatment station, and connecting said pumping station and treatment station to provide cyclical flow communication between said vessels and pumping and treatment stations;
   (b) excavating said contaminated earth and depositing the earth in one of said treatment vessels; and
   (c) activating said pumping station to urge a fluid into and through each treatment vessel wherein contaminants are removed and treated at said treatment station.

* * * * *